April 30, 1929.  T. G. PENN  1,711,325
ATTACHMENT FOR AUTOMOBILES
Filed Aug. 24, 1928
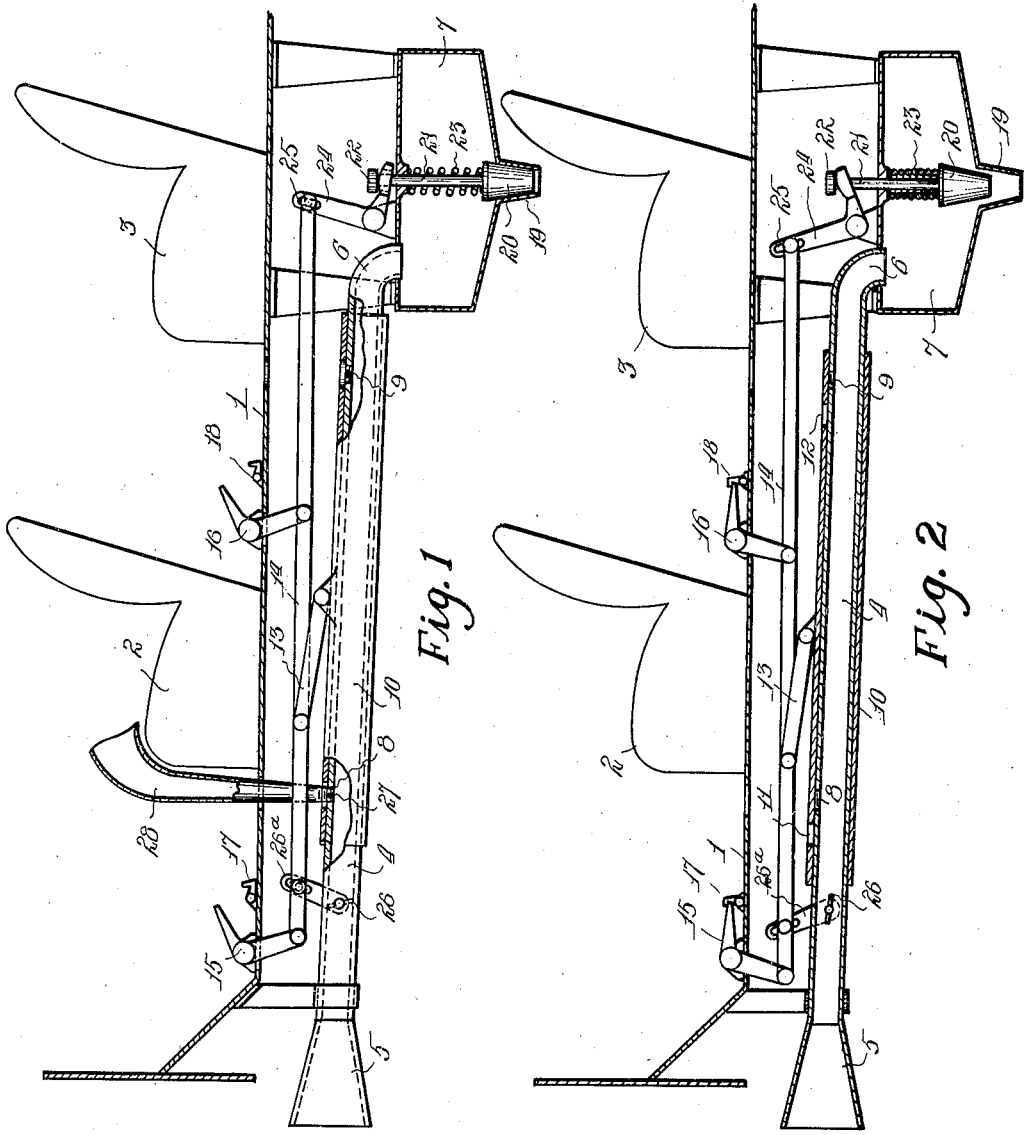
Inventor
Thomas G. Penn.
By
Attorney Patented Apr. 30, 1929.

1,711,325

UNITED STATES PATENT OFFICE.

THOMAS G. PENN, OF CHICAGO, ILLINOIS.

ATTACHMENT FOR AUTOMOBILES.

Application filed August 24, 1928. Serial No. 301,813.

My invention relates to an attachment for automobiles and other vehicles, and relates more particularly to the provision of a urinal for the comfort of the occupant or occupants of the vehicle especially when driving on long trips or when such occupants are ill, and require the frequent use of a device of this type and it is not convenient to leave the car.

It is an object of my invention to construct a device or attachment of this general character which will be simple in construction and operation and one that can be applied to any make of automobile.

It is a further object of my invention to so construct and arrange the device with relation to the seats of the automobile that it may be conveniently used at any time desired and the liquid retained in a receptacle therefor until a time when it is convenient to empty the same, for instance as when going through a town on to a roadway in the country.

Another object of my invention is to so construct the device that it will not be objectional to the occupants of the automobile nor give off an offensive odor, as it is capable of being kept clean and sanitary at all times.

Other objects and advantages in the application of my invention will be readily apparent from the following detailed description of the preferred embodiment thereof taken in connection with the accompanying drawings in which:—

Figure 1 is a side elevation of my invention attached to a vehicle, parts being in section and the urinal in position for use, and Fig. 2 is a sectional view.

For the purpose of illustrating the application of my invention a skeleton of a vehicle is shown having the usual floor 1 and seats 2 and 3. Located below the floor and secured thereto in any suitable manner is a tube or pipe 4 flared at its forward end 5 and bent downwardly at its rear end 6, where it is secured to a tank 7 which is also located below the floor and preferably at the rear end of the automobile. Spaced along the upper part of the pipe are openings 8 and 9 corresponding to the seats 2 and 3 although a greater or lesser number may be employed as desired or according to the number of seats in the automobile. It will be obvious that urine deposited in these openings will flow down the tube or pipe into the tank, as the pipe is inclined toward said tank, and in order to prevent odors from escaping from the pipe and tank there is a second pipe 10 covering the same and having openings 11 and 12 adapted to register with the openings 8 and 9 as well as cover them when said closure pipe is shifted from one position to another. For operating this pipe or closure a link 13 is pivotally connected thereto and to a pull rod 14 operated from either seat of the automobile by one of a plurality of bell crank levers 15 and 16 pivoted in bearings attached to the floor, and as shown in Fig. 2 the closure pipe covers the openings in the drain pipe in its forward position with the operating member of the bell crank lever depressed and opens said openings in rearward position in position for use with the aforesaid members of the bell crank levers raised. To lock the pipe in its closed position latches 17 and 18 are provided to hold the bell crank levers down, said bell crank levers upon being released from said latches being swung around their pivots to open the closure pipe by a spring as will be hereinafter described. The tank may be emptied by a suitable opening or drain 19 formed in the bottom wall thereof and closed by a stopper 20, said stopper being provided with a rod or stem 21 and head 22, the stem extending through the top of the tank and the head being above said tank. Encircling said stem is a spring 23 interposed between the stopper and the upper end of the tank. the force of the spring tending at all times to hold the stopper down in closed position. The stopper is operated by the aforementioned pull rod through the medium of a bell crank 24, having a slot 25 in one member thereof by which it is pivoted to said pull rod and the end of the other member bifurcated or otherwise formed to receive the rod or stem of the stopper and bear against the underside of the head thereof. It will be seen that the arrangement of the operating mechanism is such that the tank will be closed when the receiving openings are open, and will be open when the latter are closed. The flared end of the drain being directed in the direction of travel will collect air and force the same down the pipe into the tank and out the drain opening, not only drying these elements, but also creating a constant stream of air to purify the same, thereby obviating an odor and keeping the device sanitary and clean. It will be seen that with the receiving openings in alinement or open if air is allowed to rush into the drain pipe, it will be likely that a current of air will be forced up through said receiving openings and create a splash, wherefore I provide a valve or damper 26, functioning to cut off this air supply and operatively connected to the aforementioned pull rod through the medium of link 26ᵃ secured to the damper and pivoted to the pull rod by means of a slot. The receiving openings in the drain pipe are threaded to receive the screw threaded collar 27 of a funnel 28, the body of the funnel being made of rubber, either hard or soft, or any other suitable material whether fiber or metal, but soft rubber of some stability is preferred since it can be collapsed or folded and occupy a comparatively small space when not in use, it being understood of course that the funnel is removed when it is desired to close the openings leading into the pipe 10.

It will be therefore seen that I have provided a very useful attachment for vehicles of any type whatsoever, but especially useful on automobiles. The construction affords a simple and sanitary means for receiving and conveniently disposing of liquids such as urine. Various modifications of my preferred embodiment will be readily apparent, and I therefore do not wish to be limited to the exact arrangement herein shown and described, for obviously chains or other connectors can be employed in place of the link and bell cranks, as well as different types of closures such as valves, dampers, etc. Further modifications may be employed without departing from the spirit and scope of the appended claims.

I claim:

1. An attachment for vehicles comprising means for storing liquid, means for conveying liquid to said storing means, receiving openings in said conveying means, a closure for said openings, means for releasing at will the liquid in said storage means, and manually controlled means for operating said closure means and releasing means operating to close said former means and open said latter means with one movement thereof, and to open said former means and close said latter means with the opposite movement thereof.

2. An attachment for vehicles comprising means for storing liquid, means for receiving and conveying liquid to said storing means, manually controlled means for releasing at will the liquid in said storing means, and means for admitting a stream of air to said storing means to dry and purify the same; together with openings leading into said conveying means, a closure for said openings, means for releasing at will the liquid in said storage means, and manually controlled means for operating said closure means and releasing means operating to close said former means and open said latter means with one movement thereof, and to open said former means and close said latter means with the opposite movement thereof.

3. An attachment for vehicles comprising means for storing liquid, means for receiving and conveying liquid to said storing means, manually controlled means for releasing at will the liquid in said storage means, means for admitting a stream of air to said storing means to dry and purify the same, and means for controlling said stream of air; together with openings leading into said conveying means, a closure for said openings, means for releasing at will the liquid in said storage means, and manually controlled means for operating said closure means and releasing means operating to close said former means and open said latter means with one movement thereof, and to open said former means and close said latter means with the opposite movement thereof.

4. An attachment for vehicles comprising means for storing liquid, means for receiving and conveying liquid to said storing means, manually controlled means for releasing at will the liquid in said storing means, means for admitting a stream of air to said storing means to dry and purify the same, and means for controlling said stream of air, said air control means operatively connected to said manual control to shut off the air when the receiving means are open and to turn on the air when the same are closed; together with openings leading into said conveying means, a closure for said openings, means for releasing at will the liquid in said storage means, and manually controlled means for operating said closure means and releasing means operating to close said former means and open said latter means with one movement thereof, and to open said former means and close said latter means with the opposite movement thereof.

5. An attachment for vehicles for disposing of liquid, comprising a drain pipe receiving openings in said pipe, a storage tank, an opening in said tank, controlled stopper means for said opening, said pipe being inclined toward and entering said tank, said controlled stopper means comprising a stopper fitting said opening, a stem rising from said stopper, passing through the top of said tank and terminating in a head, and spring means encircling said extension and bearing on said stopper and said tank top and a lever operatively connected to said head.

6. An attachment for vehicles for disposing of liquid, comprising a drain pipe receiving openings in said pipe, a storage tank, an opening in said tank, controlled stopper means for said opening, said pipe being inclined toward and entering said tank, and closure means for said drain pipe receiving openings, said closure means comprising a closure pipe surrounding said drain pipe and reciprocating thereon, to close said receiving means in one position thereof, said closure pipe having openings to aline with said receiving openings in the other position thereof, and an operating link connected to said closure pipe.

7. An attachment for vehicles for disposing of liquid, comprising a drain pipe receiving openings in said pipe, a storage tank, an opening in said tank, controlled stopper means for said opening, said pipe being inclined toward and entering said tank, said controlled stopper means comprising a stopper fitting said opening, a stem rising from said stopper, passing through the top of said tank and terminating in a head, and spring means encircling said extension and bearing on said stopper and said tank top and a lever operatively connected to said head; together with closure means for said drain pipe receiving openings, said closure means comprising a closure pipe surrounding said drain pipe and reciprocating thereon, to close said receiving means in one position thereof, said closure pipe having openings to aline with said receiving openings in the other position thereof, an operating link connected to said closure pipe, a single main link connected to said stopper lever and said closure link operating to close said tank and open said receiving openings when moved in one direction, and operating to open said tank and close said receiving openings when moved in the reverse direction, and latchable means for so operating said main link.

8. An attachment for vehicles for disposing of liquid, comprising a drain pipe receiving openings in said pipe, a storage tank, an opening in said tank, controlled stopper means for said opening, said pipe being inclined toward and entering said tank, said controlled stopper means comprising a stopper fitting said opening, a stem rising from said stopper, passing through the top of said tank and terminating in a head, and spring means encircling said extension and bearing on said stopper and said tank top and a lever operatively connected to said head; together with closure means for said drain pipe receiving openings, said closure means comprising a closure pipe surrounding said drain pipe and reciprocating thereon, to close said receiving means in one position thereof, said closure pipe having openings to aline with said receiving openings in the other position thereof, an operating link connected to said closure pipe, a single rod connected to said stopper lever and said closure link operating to close said tank and open said receiving openings when moved in one direction, and operating to open said tank and close said receiving openings when moved in the reverse direction and latchable means for so operating said main rod, said drain pipe being flared at the end opposite said tank to collect and admit air to the apparatus, means for closing off said flared end, and means for operating said closing means operatively connected to said main rod, screw threads on said drain pipe receiving openings and a detachable funnel screwed with said threads.

THOMAS G. PENN.